(No Model.)　　　　　　T. G. COLEMAN.　　　2 Sheets—Sheet 1.
UNICYCLE ROAD AND RACING SULKY.

No. 592,130.　　　　　　　　Patented Oct. 19, 1897.

WITNESSES　　　　　　　　　　　　　　　　INVENTOR
W. G. Allen.　　　　　　　　　　　Thomas Gardner Coleman.
A. M. Poynton.　　　　　　　　　By John Hedderburn
　　　　　　　　　　　　　　　　　　　　　　Attorney

THE NORRIS PETERS CO., PHOTO-LITHO., WASHINGTON, D. C.

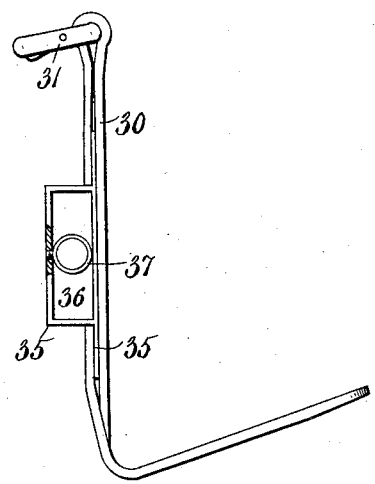
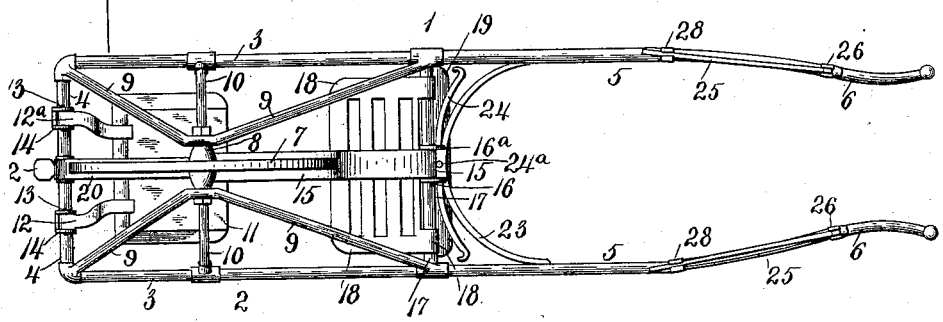
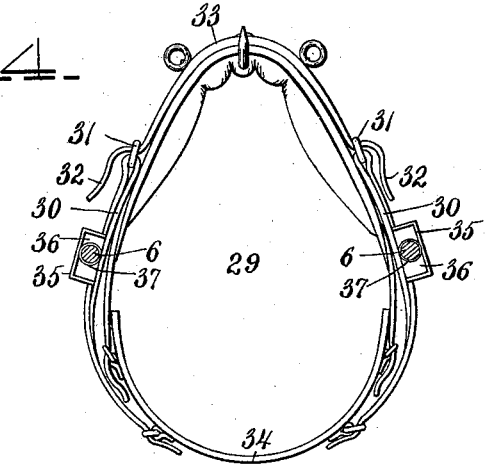

UNITED STATES PATENT OFFICE.

THOMAS GARDNER COLEMAN, OF GUNSIGHT, TEXAS.

UNICYCLE ROAD AND RACING SULKY.

SPECIFICATION forming part of Letters Patent No. 592,130, dated October 19, 1897.

Application filed March 25, 1897. Serial No. 629,246. (No model.)

*To all whom it may concern:*

Be it known that I, THOMAS GARDNER COLEMAN, of Gunsight, in the county of Stephens and State of Texas, have invented certain new and useful Improvements in One-Wheeled Vehicles; and I do hereby declare the following to be a full, clear, and exact description of the invention, such as will enable others skilled in the art to which it appertains to make and use the same.

My invention has for its object the production of a one-wheeled vehicle in which the frame and shafts are constructed of tubing or other material bent to the desired shape, and combining certain novel improvements in the construction and arrangements of the several parts of the vehicle, and harness attachments adapted especially for use therewith, as will be hereinafter more fully described, and specifically set forth in the appended claims.

Figure 1:
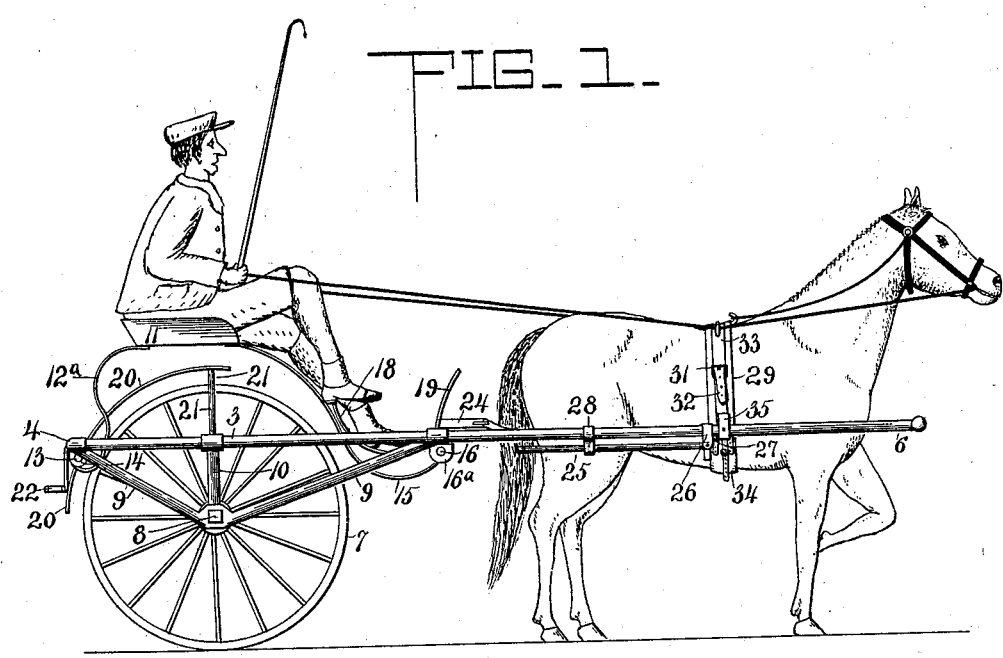
Figure 2:
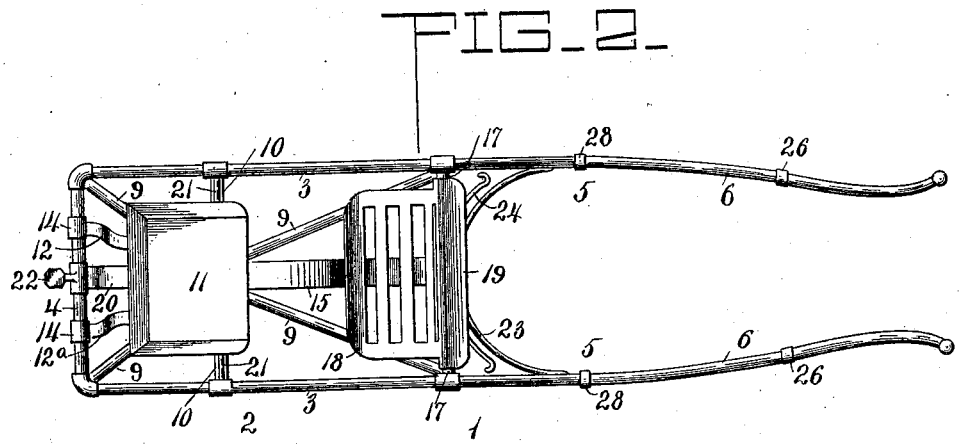

In the accompanying drawings, Figure 1 is a side elevation of a vehicle constructed in accordance with my invention. Fig. 2 is a top plan view of the same. Fig. 3 is a bottom plan view. Fig. 4 is a cross-sectional view through the shafts of the vehicle, showing the harness-saddle and parts connected therewith. Fig. 5 is an enlarged detail view of one of the shaft-straps of the harness-saddle.

Like numerals designate corresponding parts throughout the several figures of the drawings.

Referring to the drawings, the numeral 1 designates a tubing or other material bent to form a three-sided rear portion 2, comprising the vehicle-frame, and 3 side-bars of said frame connected at the rear by a return-bend portion 4, the front extremities of said arms being suitably curved at 5 to form the vehicle-shaft 6. I preferably construct the frame and shafts of tubing for the purpose of lightness, strength, and elasticity.

The wheel 7 of the vehicle is mounted between the two side-bars of the frame on a shaft 8, journaled in the lower ends of two approximately-V-shaped hangers 9, connected with the frame and extending downwardly and inwardly therefrom. This shaft may be fixed to the said hangers, in which case the wheel would be revolubly mounted thereon, or may be journaled in bearings in said hangers, in which case the wheel would be rotatably mounted on said shaft. Brace-bars 10, projecting from the side-bars of the vehicle, connect with the apex of the said V-shaped hangers and serve to strengthen the same.

A seat 11 is mounted adjoining the return-bend or rear cross-bar of the frame upon two curved metal springs 12 12$^a$, having their lower ends coiled around pins 13, carried by brackets 14 on the under side of said cross-bar, and a metal spring 15, curved forwardly and having its front extremity coiled around a cross-pin 16, connected with a bracket 16$^a$, pendent from the cross-bar 17, extending across between the side-bars of the frame in front of the wheel and separating the frame proper of the vehicle from the shafts. A curved foot-rest 18, constructed of spring metal, is secured to the said cross-bar 17 and the front extremities of the V-shaped hangers, and is adapted to effectually absorb all vibration caused by the movement of the vehicle. The dash 19 of the vehicle is also secured to said cross-bar, as shown.

A wheel-guard 20 covers the upper portion of the vehicle-wheel, and is connected with the rear cross-bar of the frame and with a bow-shaped connecting-rod 21, extending between the two side-bars of the frame. This wheel-guard serves the double function of a guard for the wheel and a stop to limit the downward movement of the vehicle-seat. A step 22 is also connected with the said rear cross-bar or return-bend portion of the frame. A bow-shaped brace 23 connects between the two shaft sides in advance of the cross division-bar 17, and a singletree 24 is swiveled thereto by a king-bolt 24$^a$.

Folding supporting-legs 25 are pivoted between two pendent ears 26, projecting from the under side of each shaft, and are provided with laterally-bent portions 27 to abut against the under side of the shaft and limit the outward movement of said legs. The inner ends of said legs are adapted to fit and be retained within spring-clips 28, also projecting from the under side of the shaft in rear of the said pendent ears. By this construction, when the legs are folded up, a slight space is left between them and the under side of the shafts, for a purpose presently described, and when the said legs are unfolded, so as to rest upon the ground, an efficient support, to hold the shafts in an elevated position and prevent the vehicle from tilting over, while hitching or unhitching, is provided.

The numeral 29 designates a harness-saddle which is constructed and designed especially for use with my improved vehicle. This saddle is provided with shaft-straps 30, having at their upper ends buckles 31, adapted to engage openings in the opposite ends 32 of an attaching-strap 33, secured to said saddle. The saddle is also provided with a girth 34. Each shaft-strap has secured to it a plate 35, provided with a shaft-loop 36, in which are swiveled collars 37, adapted to permanently inclose and fit on the shafts in the space between the same and the pivoted supporting-legs 25. The movement of these swivel-collars on the shaft is limited by the pendent ears 26 and spring-clips 28, the latter serving as stops to hold back the vehicle in descending a grade, whereby the holdback-straps usually employed are entirely dispensed with. The shaft-loops and swivel-collars prevent the shafts from playing up and down on the sides of the horse, thereby rendering the vehicle steady, but the said swivel-collars are adapted to freely oscillate to accommodate the free movement of the shafts when the horse steps down into a depression, or steps up when encountering an elevation, and thereby all strain on the harness is prevented.

While I have described the shaft as constructed of a single piece of tube, it is obvious that it may be made of tubular section suitably connected, or of a rod bent to the described shape.

Having thus described my invention, what I claim as new, and desire to secure by Letters Patent, is—

1. A one-wheel vehicle, comprising a frame composed of metal tubing and made in separable sections coupled together, said frame consisting of a pair of side-bars extended to form thills and connected in front and rear of the carrying-wheel by cross-bars, pendent V-shaped hangers connected at their ends to the side-bars and declining inward or converging toward their lower ends or vertices, side or lateral braces interposed between the vertices of said hangers and the side-bars, a carrying-wheel journaled between the convergent ends of said hanger, and a superposed seat, substantially as described.

2. A one-wheel vehicle, comprising a frame and composed of metal tubing and made in separable sections coupled together, said frame consisting of a pair of side-bars extended to form thills and connected in front and rear of the carrying-wheel by cross-bars, pendent V-shaped hangers connected at their ends to the side-bars and declining inward or converging toward their lower ends or vertices, a carrying-wheel journaled between the convergent ends of said hangers, a superposed seat over the wheel, a pair of springs interposed between the rear edge of the seat and the rear cross-bar, and a centrally-located spring interposed between the front edge of the seat and the forward cross-bar in advance of the wheel, substantially as described.

3. A one-wheel vehicle, comprising a frame composed of metal tubing, said frame consisting of a pair of side-bars extended to form thills connected in front and rear of the carrying-wheel by cross-bars, pendent V-shaped hangers connected at their ends to the side-bars and declining inward or converging toward their lower ends, a carrying-wheel journaled between the convergent ends of said hangers, a superposed seat above the wheel, a transverse arch connected at its ends to the side-bars and sprung over the wheel, and a wheel-guard connecting said arch to the rear cross-bar of the frame and constituting a limiting-stop for the seat in the downward movement of the latter, substantially as described.

In testimony whereof I have signed this specification in the presence of two subscribing witnesses.

THOMAS GARDNER COLEMAN.

Witnesses:
E. J. WARD,
B. B. GREENWOOD.